UNITED STATES PATENT OFFICE.

RASIKLAL DATTA, OF CALCUTTA, INDIA.

PROCESS OF PRODUCING BROMIN.

1,267,638.  Specification of Letters Patent.  Patented May 28, 1918.

No Drawing.   Application filed August 17, 1916.   Serial No. 115,555.

*To all whom it may concern:*

Be it known that I, RASIKLAL DATTA, a subject of the King of Great Britain, residing at Calcutta, India, have invented certain new and useful Improvements in Processes of Producing Bromin, of which the following is a specification.

My invention relates to a process of producing bromin from alkali metal or alkaline earth metal bromids; and to a process of producing bromin from hydrobromic acid, which is obtained as a by-product in the production of the bromin from the metal bromids.

The process consists generally in treating a metal bromid with nitrosyl sulfuric acid, or sulfuric acid in which nitrous gases have been absorbed, for producing nitrosyl bromids. These bromids are oxidized or decomposed to form bromin and nitrous gases. The process further consists of the combination of steps hereinafter described and recited in the claim.

In the practice of my process, in its preferred form, the alkali metal or alkaline earth metal bromids are placed in an earthen ware retort and nitrosyl sulfuric acid, or sulfuric acid in which nitrous gases have been absorbed, is gradually added, the retort being suitably heated. As a result of this chemical reaction which takes place, a mixture of nitrosyl bromids, (NOBr and $NOBr_3$), is obtained.

These nitrosyl bromids are separated out and in a gaseous form are passed through a suitably heated tube, containing pumice stone or similar substance, in the presence of a current of air. The nitrosyl bromids are thus quantitatively oxidized, forming bromin and nitrous gases ($N_2O_3$ and $N_2O_4$).

This mixture of bromin and nitrous gases, in the form of a gas, is passed through empty condensing towers or spiral condensers, connected in series. These condensing towers are surrounded by a cooling medium, such as ice cooled water, whereby the bromin condenses and is collected in the bottom of the towers and may be withdrawn, while the nitrous gases may escape from the apparatus for further treatment. In this condensation of the bromin, care should be taken not to unduly reduce the temperatures of the towers, for otherwise some of the nitrous gases would also become condensed, and mixed with the bromin.

The nitrous gases ($N_2O_3$ and $N_2O_4$) escaping from the apparatus are passed through the series of towers containing the strong sulfuric acid, and are dissolved, in this acid, forming nitrosyl sulfuric acid. This nitrosyl sulfuric acid, thus obtained, may be used in the decomposition of a fresh quantity of the alkali metal or alkaline earth metal bromids. The towers containing the sulfuric acid are connected in series, and when the acid in the first tower becomes completely saturated with the nitrous gases, this tower is disconnected from the remaining towers. The nitrous gases are then supplied into the next tower and a tower containing fresh sulfuric acid, connected with the last tower. In this manner fresh amounts of sulfuric acid are advanced thorugh the towers, connected in series.

The nitrosyl bromids (NOBr and $NOBr_3$), produced in the above manner, instead of being passed through a heated tube, as described, for their decomposition, may be condensed in a suitable receiver, and this condensed product decomposed by means of a current of air and steam, which is applied to or passed through the same. When treated in this manner, the bromin and nitrous gases are liberated and pass over into the condensers or cooled towers. The nitrous gases discharge from the condensation towers, and are passed through the towers containing the sulfuric acid, and are absorbed by the acid. The aqueous solution which remains in the receiver (within which the nitrosyl bromids were subjected to the action of steam and air) contains a considerable amount of hydrobromic acid. A process will be stated hereinafter for oxidizing or decomposing this hydrobromic acid.

When the alkali metal or alkaline earth metal bromids are treated with nitrosyl sulfuric acid for obtaining the nitrosyl bromids, as above stated, an acid sulfate is left in the retort. To utilize this acid sulfate in the production of hydrobromic acid, which is to be oxidized or decomposed for forming bromin, the acid sulfate is heated with an equivalent quantity, by weight, of alkali metal bromids, whereby it is decomposed into the normal sulfate and hydrobromic acid, as illustrated in the following equation:

$$NaBr + NaHSO_4 = Na_2SO_4 + HBr.$$

The hydrobromic acid thus formed is oxidized by passing it through a heated tube containing pumice stone, in the presence of nitrous gases and air. The oxidization of the acid is represented in the following equation:

$$2HBr + N_2O_3 = H_2O + Br_2 + 2NO.$$

The nitric oxid (2NO) in the presence of the oxygen in the air becomes oxidized to nitrous gases, as indicated in the following equations:

$$2NO + O = N_2O_3$$
$$2NO + O_2 = N_2O_4$$

These nitrous gases may be employed for reacting upon fresh hydrobromic acid. A small quanity of nitric oxid can be used for oxidizing a large quantity of hydrobromic acid. The gases escaping from the apparatus, wherein the hydrobromic acid is oxidized, consist of bromin, nitrous gases and air, deficient in oxygen. These gases are passed through the cooled condensation towers, wherein the bromin is condensed and separated from the nitrous gases, and the nitrous gases passed through the towers containing sulfuric acid, forming nitrosyl sulfuric acid, as above described.

The nitrous gases for the oxidization of the hydrobromic acid, may be fresh gas or the nitrous gases liberated from the nitrosyl sulfuric acid. However, it is found that the latter is generally uneconomical in use, since nitrosyl bromids formed from the alkali metal or alkaline earth metal bromids are more easily decomposed or oxidized into bromin.

The hydrobromic acid liberated by the action of the alkali metal bromids and the sulfuric acid can be oxidized in a similar manner, but it has been generally found satisfactory to oxidize the hydrobromic acid only which is formed from the acid sulfate acted upon by the alkali metal or alkaline earth metal bromids, the acid sulfate being obtained as a by-product of the decomposition of nitrosyl sulfuric acid with the metal bromids.

In the above oxidization process, the escaping gases after the condensation of bromin and absorption of nitrous gases consist of air richer in nitrogen. This air can be freed from the small quantity of oxygen, still remaining therein, by any well known process, and the pure nitrogen thus obtained can be fixed by any well known process.

Having thus described the invention, I claim:

The herein described process of producing bromin which consists in oxidizing nitrosyl bromids for forming bromin and nitrous gases, and separating out the bromin thus produced.

In testimony whereof I affix my signature in presence of two witnesses.

RASIKLAL DATTA.

Witnesses:
 ANSHOOTOSH INVOKEYIE,
 RUPERT REMFRY.